Figure 1:
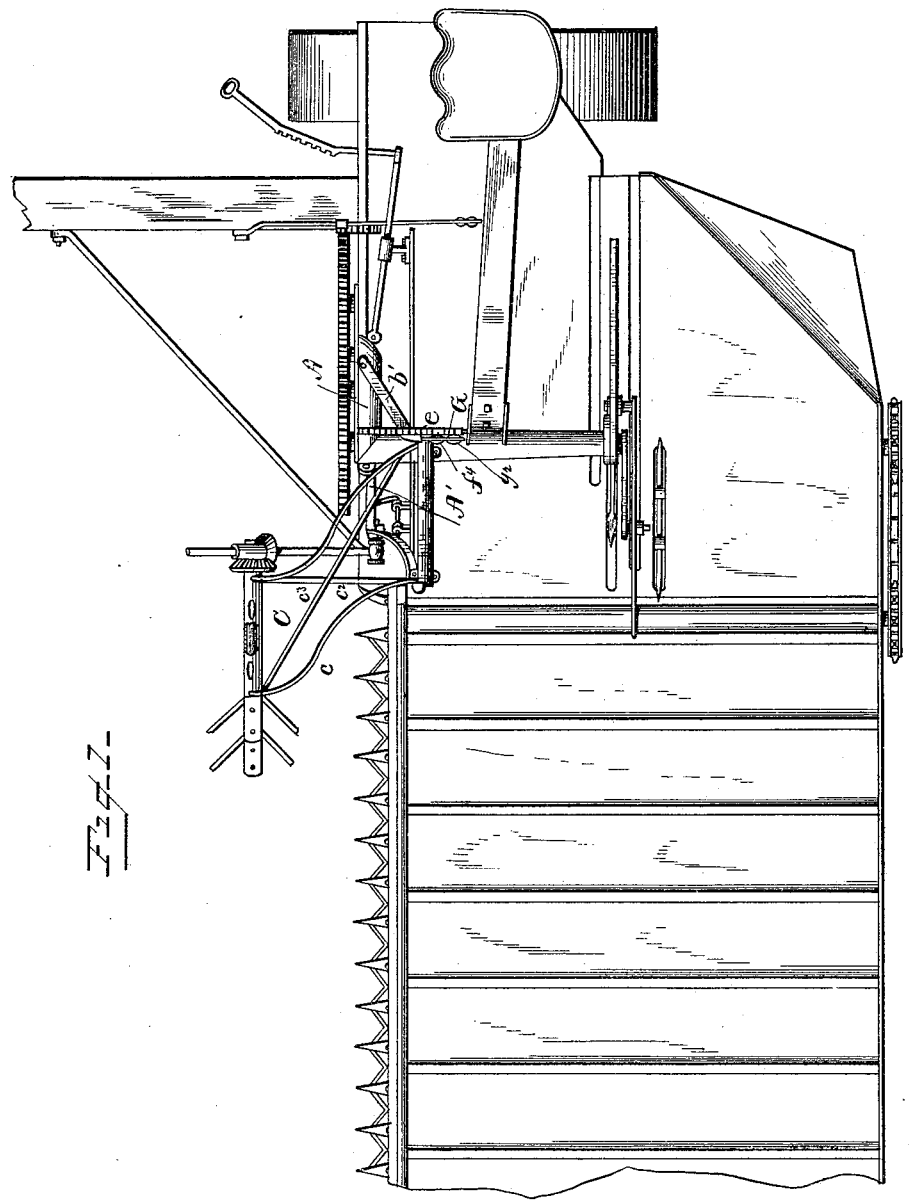

(No Model.) 2 Sheets—Sheet 1.

L. MILLER & A. E. ELLINWOOD.
REEL SUPPORT FOR HARVESTERS.

No. 332,732. Patented Dec. 22, 1885.

WITNESSES
Franck L. Ouraud
Rex M. Smith.

INVENTORS:
Lewis Miller
Augustus E. Ellinwood
by A. M. Smith
Attorney

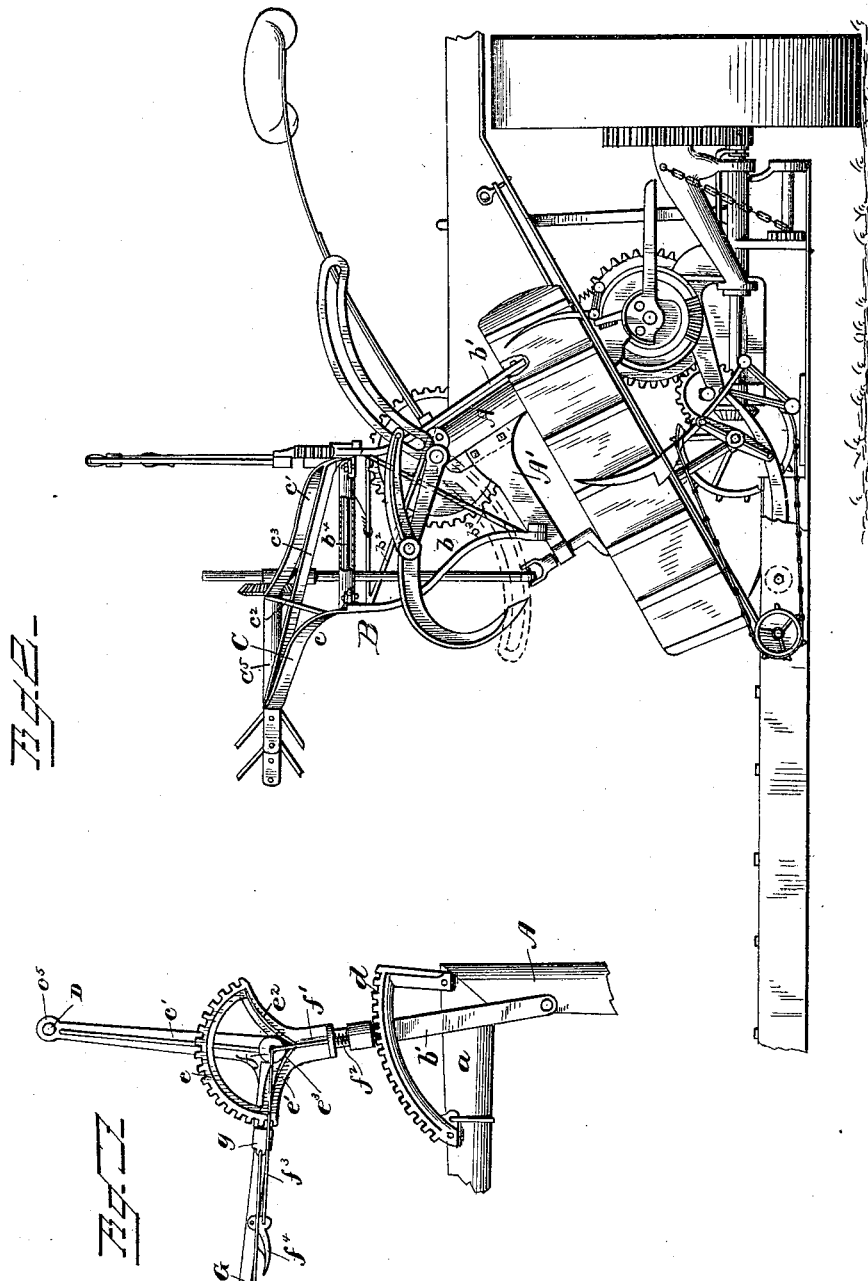

UNITED STATES PATENT OFFICE.

LEWIS MILLER AND AUGUSTUS E. ELLINWOOD, OF AKRON, OHIO.

REEL-SUPPORT FOR HARVESTERS.

SPECIFICATION forming part of Letters Patent No. 332,732, dated December 22, 1885.

Application filed May 17, 1884. Serial No. 131,831. (No model.)

*To all whom it may concern:*

Be it known that we, LEWIS MILLER and AUGUSTUS E. ELLINWOOD, of Akron, county of Summit, and State of Ohio, have invented a new and useful Improvement in Reel-Supports for Harvesters, of which the following is a full, clear, and exact description, reference being had to the accompanying drawings, making part of this specification.

This invention relates to the means for supporting, for effecting the adjustment of, and for holding, the reel at any desired adjustment, in machines in which the grain is bound, between the platform-carrier and the path of the driving-wheel; and it consists in a novel manner of combining the reel-standard with the binder-gear standard supporting it, in a novel construction of the jointed reel-standard, in a novel means for actuating the pawl or latch which holds the pivoted reel-standard at the desired adjustment, and in the combination of the thumb-levers for releasing the latches which hold the reel in both its horizontal and vertical adjustments with the single hand-lever for adjusting the reel both horizontally and vertically, as hereinafter explained.

In the accompanying drawings, Figure 1 is a plan view of a harvester with our improvement applied. Fig. 2 is a rear elevation of the same; and Fig. 3 is a side elevation, looking from the stubble side, of a portion of the binder-gear standard, of the jointed reel-standard, and of the means for adjusting and holding the latter.

A represents the binder-gear standard, supported upon the inner end of the main or platform frame, in advance of the path of the grain on the platform-carrier and over the binder-table and between the platform-carrier and the path of the driving-wheel, with its tubular arms, in which the needle and knotter actuating shafts are mounted, projecting rearwardly, one over and the other underneath the binder-table. To the grain side of the gear-standard A is secured a laterally-projecting arm, A', the outer end of which has a bearing for the upper end of the grain adjuster and butter shaft, and upon this arm is formed a lug or ear, to which is pivoted one arm or leg, $b$, of an upright frame, B, forming the lower portion of the jointed reel post or support, another arm or leg, $b'$, extending down on the stubble side of the upper tubular arm of the binder-gear standard and being pivoted to the latter in line or nearly in line with the pivot or arm $b$. The upright portions $b$ and $b'$ are curved or inclined toward the grain-platform, for getting the upper end of the frame well over toward the grain-platform, and they are connected by diagonal braces $b^2$ and $b^3$, which serve to materially stiffen the frame, and at their upper ends by a horizontal bar or rod at $b^4$, which may also serve as a pivot for a sleeve or tubular bar, forming the lower transverse bar of the upper portion of the jointed reel-support. This upper portion, C, like the lower portion, B, is in the form of a frame, with its side bars, $c$ and $c'$, curved or inclined in the same direction and connected by diagonal braces $c^2$ and $c^3$ for a similar purpose. The end bars, $c^4$ and $c^5$, are by preference made tubular, one, $c^4$, surrounding and turning upon the upper transverse rod, $b^4$, of the frame B, and the other, $c^5$, forming a tubular bearing for the reel-shaft D, the inner end of which projects through said sleeve and has a gear-wheel keyed to it, through which it may be actuated by a sliding gear-wheel on a tumbling-shaft extension of the grain adjuster and butter shaft, as shown, or in other suitable manner.

By the construction described a strong but light jointed reel-support is obtained, one that affords a bearing of any desired length for the reel-shaft for preventing sagging of the reel, and that brings said bearing into such proximity with the reel as to avoid unnecessary elongation of its shaft. The curved or inclined portion of the upright $b'$ of the frame or portion B, in the construction shown, is represented as passing over the upper sleeve, $a$, of standard A, and underneath a toothed rack or segment, $d$, which is secured at its ends through suitable feet to said sleeve, the arrangement being such as to permit the upright $b'$ to be adjusted or vibrated back and forth between said supporting-feet for setting the reel farther back or forward, as may be required. The upper end of the upright $b'$ has a toothed segment, $e$, secured to it, through radial arms $e'$ $e^2$, which have ledges or flanges formed upon their sides, which unite and form substantially a V-shaped track at $e^3$, at the bottom or angle of which rests a friction-roller, $f$, or any suitable slide, the pivot of which is connected to or formed upon a sliding rod, $f'$, which passes through suitable guides on the side of the upright $b'$, and at its lower end forms or is jointed to the latch engaging the rack $d$ for holding the portion B of the reel-standard at any desired adjustment, a spring at $f^2$ serving to hold the latch engaged with said segment. From the pivot of roller or slide block $f$ a rod, $f^3$, extends to a thumb-lever, $f^4$, of usual form, on the hand-lever G, through which the adjustments of the reel are effected, as will be explained. When the lever G stands in an upright position parallel with the frame-bar $b'$, the rod $f^3$ will be in line with the latch-rod $f'$, and, forming an extension thereof, will serve, when lifted, to lift the roller $f$ from the track, lifting the latch-rod out of engagement with its holding-segment $d$ for permitting the adjustment backward or forward of the reel-post and reel, whereas if the lever G is thrown down to the rear for raising or to the front for depressing the reel when the thumb-lever $f^4$ is operated for releasing the latch $f'$, it draws the roller or slide block $f$ upward on one side of the V-shaped track $e^3$, and the latter acts to release the latch $f'$ from the rack $d$, when the reel-post can be adjusted backward or forward, as desired, by means of the hand-lever or rod G. The lever G is rigidly connected with the portion C of the jointed reel-post, at or near the lower or pivoted end of the latter, and serves by its adjustment to raise or lower the reel in an arc of a circle around the pivot $b^4$ as a center.

Upon the lever G, in suitable guides thereon, is the latch $g$, similar to $f'$, which engages the rack $e$ for holding the lever G, and with it the portion C of the reel-post, at any desired adjustment. This latch is connected by a rod, $g'$, with a thumb-lever, $g^2$, also pivoted to lever G, and so arranged that by grasping it and the lever G together the attendant can release the latch $g$ from the rack $e$, when by moving the lever G the height of the reel can be adjusted, as described. The thumb-levers for releasing the latches $f'$ and $g$ are thus both combined with a single hand-lever, by means of which both the backward and forward or horizontal and vertical adjustments of the reel are effected, and are so arranged thereon that the attendant can grasp either in taking hold of the hand-lever without disturbing the other, according to the adjustment of the reel desired.

Having now described the invention, what we claim as new is—

1. The jointed reel standard or support, pivoted at its lower end directly to and upheld by the binder-gear standard, substantially as described.

2. The combination, with the binder-gear standard, of the jointed reel-supporting standard composed of frames, the uprights or side bars of which are curved or inclined over the grain-platform from their pivotal points of support, substantially as and for the purpose described.

3. The toothed rack on the binder-gear standard, in combination with the pivoted upright of the reel-standard, and the latch on said reel-standard engaging said rack, substantially as described.

4. The toothed rack on the binder-gear standard, in combination with the pivoted upright of the reel-standard, passing and adjustable between said rack and the tubular arm of the gear-standard and the latch on said reel-standard engaging said rack, substantially as described.

5. The pivoted and jointed reel-standard provided with the V-shaped or double incline track, in combination with the latch for holding said reel-standard at any desired adjustment, substantially as and for the purpose described.

6. The pivoted and jointed reel-standard, in combination with the segment-racks $d$ and $e$, the latter provided with the inclined V-shaped track, the sliding latch, and means connected with the reel-adjusting lever for actuating the latch.

7. The jointed and pivoted reel-supporting standard hinged to and supported by the binder-gear standard, in combination with the segment racks, the single hand-lever for adjusting the reel both horizontally and vertically, the two retaining-latches for holding the reel at any desired adjustment, both having connection with the single hand-lever, and means for operating said latches, substantially as described.

In testimony whereof we have hereunto set our hands this 26th day of April, A. D. 1884.

LEWIS MILLER.
AUGUSTUS E. ELLINWOOD.

Witnesses:
O. L. SADLER,
N. A. MEANS.